United States Patent
Chen et al.

(10) Patent No.: US 9,979,977 B2
(45) Date of Patent: May 22, 2018

(54) METHODS AND DEVICES OF GENERATING AND DECODING IMAGE STREAMS WITH RESPECTIVE VERIFICATION DATA

(71) Applicant: INDUSTRIAL TECHNOLOGY RESEARCH INSTITUTE, Chutung, Hsinchu (TW)

(72) Inventors: Yi-Yuan Chen, Taoyuan (TW); Lih-Guong Jang, Hsinchu (TW); Wen-Kuei Lai, Kaohsiung (TW); Nien-Chu Wu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 212 days.

(21) Appl. No.: 14/975,221

(22) Filed: Dec. 18, 2015

(65) Prior Publication Data
US 2017/0085893 A1 Mar. 23, 2017

(30) Foreign Application Priority Data
Sep. 18, 2015 (TW) .............................. 104130918 A

(51) Int. Cl.
*H04N 19/40* (2014.01)
*H04N 19/80* (2014.01)
(Continued)

(52) U.S. Cl.
CPC .............. *H04N 19/40* (2014.11); *H04L 69/28* (2013.01); *H04N 19/467* (2014.11); *H04N 19/80* (2014.11)

(58) Field of Classification Search
CPC ...... H04N 19/40; H04N 19/467; H04N 19/80; H04L 69/28
See application file for complete search history.

(56) References Cited

U.S. PATENT DOCUMENTS 8,213,801 B2 7/2012 Nien et al.
8,494,218 B2 7/2013 Chen et al.
(Continued)

FOREIGN PATENT DOCUMENTS

CA 2606052 11/2006
CN 101273375 A 9/2008
(Continued)

OTHER PUBLICATIONS

Darian Skarica, et al., "Implentation and Evaluation of Mobile Ticket Validation Systems for Value-Added Services", Software Telecommunications & Computer Networks, 2009, SoftCOM 2009, 17th International Conference on, HVAR, Sep. 24-26, 2009, pp. 260-264.
(Continued)

*Primary Examiner* — Christopher S Kelley
*Assistant Examiner* — Nasim Nirjhar
(74) *Attorney, Agent, or Firm* — Muncy, Geissler, Olds & Lowe, P.C.

(57) ABSTRACT

A method and device of generating an image stream with verification data are provided. The method includes the following steps. First, determine at least one pixel in a first image according to a first encoding parameter. Then, generate a timing data sequence associated with information about the correlation between the verification data and time points according to a second encoding parameter and the verification data. Next, modify a pixel value of the at least one pixel in the first image to generate a second image according to the verification data corresponding to one of the time points in the timing data sequence. Lastly, generate the image stream including the second image.

17 Claims, 24 Drawing Sheets

(51) Int. Cl.
*H04L 29/06* (2006.01)
*H04N 19/467* (2014.01)

(56) References Cited

U.S. PATENT DOCUMENTS

| | | | |
|---|---|---|---|
| 8,805,202 B2 | 8/2014 | Suzuki et al. | |
| 8,910,274 B2 | 12/2014 | Sanders | |
| 8,924,712 B2 | 12/2014 | Varadarajan et al. | |
| 9,501,683 B1* | 11/2016 | Hatstat | G06K 7/1491 |
| 2005/0041840 A1 | 2/2005 | Lo | |
| 2006/0097062 A1* | 5/2006 | Cheong | G06K 19/06037 235/494 |
| 2006/0285169 A1 | 12/2006 | Miki et al. | |
| 2007/0058987 A1 | 3/2007 | Suzuki | |
| 2010/0067916 A1 | 3/2010 | Suzuki et al. | |
| 2010/0219234 A1 | 9/2010 | Forbes | |
| 2011/0228972 A1 | 9/2011 | Nakamura et al. | |
| 2012/0314090 A1* | 12/2012 | Jallow | H04W 4/008 348/207.1 |
| 2013/0170695 A1 | 7/2013 | Anan et al. | |
| 2013/0208027 A1 | 8/2013 | Bae et al. | |
| 2013/0317916 A1 | 11/2013 | Gopalakrishnan et al. | |
| 2014/0023378 A1 | 1/2014 | Bae et al. | |
| 2014/0103105 A1* | 4/2014 | Chen | G06K 19/06112 235/375 |
| 2015/0087408 A1 | 3/2015 | Siemasko et al. | |
| 2016/0234186 A1* | 8/2016 | Leblond | G06Q 10/06 |

FOREIGN PATENT DOCUMENTS

| | | | |
|---|---|---|---|
| CN | 103490812 A | 1/2010 | |
| CN | 101674133 A | 3/2010 | |
| CN | 101995240 A | 3/2011 | |
| CN | 102449651 A | 5/2012 | |
| CN | 102842081 A | 12/2012 | |
| EP | 1877971 A1 | 1/2008 | |
| EP | 2164190 A1 | 3/2010 | |
| TW | I230906 | 6/2005 | |
| TW | I271668 | 11/2006 | |
| TW | I335546 | 6/2008 | |
| TW | M364921 U1 | 9/2009 | |
| TW | I375919 | 12/2009 | |
| TW | I387226 B1 | 2/2013 | |
| TW | I416922 B | 11/2013 | |
| TW | 201349144 A | 12/2013 | |
| TW | I437509 B | 5/2014 | |
| TW | I438706 B | 5/2014 | |
| TW | I1438706 B | 5/2014 | |
| TW | I480842 B | 4/2015 | |
| WO | WO2006/114613 A1 | 11/2006 | |
| WO | WO2013/015554 A3 | 1/2013 | |

OTHER PUBLICATIONS

David Conde-Lagoa et al., "Secure eTickets Based on QR-Codes with User-Encrypted Content", Consumer Electronics (ICCE), 2010 Digest of Technical Papers International Conference on, Las Vegas, NV, Jan. 9-13, 2010, pp. 260-264.
Sharifah Nurul et al., "A Conceptual Design of Genuine Halal Logo Detector", 2011 EEEE International Conference on Imagining Systems and Techniques, pp. 296-301.
Peng Ji, et al., "Vehicular Visible Light Communications with LED Taillight and Rolling Shutter Camera", Vehicular Technology Conference (VTC Spring), 2014 IEEE 79th, May 18-21, 2014, pp. 1-6.
Bingsheng Zhang, et al., "SBVLC: Secure Barcode-based Visible Light Communicatin for Smartphones", INFOCOM, 2014 Proceedings IEEE, Apr. 27, 2014-May 2, 2014, pp. 2661-2669.
Sartid Vongpradhip, "Use Multiplexing to Increase Information in QR Code", The 8th International Conference on Computer Science & Education, Apr. 26-28, 2013. Colombo, Sri Lanka, pp. 361-364.

* cited by examiner

METHODS AND DEVICES OF GENERATING AND DECODING IMAGE STREAMS WITH RESPECTIVE VERIFICATION DATA

CROSS-REFERENCE TO RELATED APPLICATIONS

This non-provisional application claims priority under 35 U.S.C. § 119(a) on Patent Application Ser. No(s). 104130918 filed in Taiwan, R.O.C. on Sep. 18, 2015, the entire contents of which are hereby incorporated by reference.

TECHNICAL FIELD

The disclosure relates to methods and devices of generating and decoding image streams having respective verification data.

BACKGROUND

The prevalence of smart phones and a widespread network have caused electronic tickets to replace paper tickets. However, the large amount of electronic tickets also causes a problem of verifying the electronic tickets.

Electronic tickets nowadays are usually expressed with quick response codes (QR Codes). This requires users to provide a password in order to ensure the security protection, so this security protection is still imperfect. The more the variety and amount of electronic tickets, the more consumers feel inconvenience. On the other hand, modern point-of-sale (POS) electronic funds transfer systems have not had any standard against the verification of electronic tickets. This may nag at stores in their business. The stores need to spend much manual labor on receiving tickets and then keying the consumption data into their systems. Also, mistakes may easily occur while doing this work.

SUMMARY

According to one or more embodiments, the disclosure provides a method of generating an image stream having verification data. In an embodiment, the method includes the following steps. Determine at least one pixel in a first image according to a first encoding parameter. Generate a timing data sequence associated with information about correlation between time points and the verification data according to a second encoding parameter and the verification data. Modify a pixel value of the at least one pixel in the first image to generate a second image according to the verification data corresponding to one of the time points in the timing data sequence. Generate an image stream including the second image.

According to one or more embodiments, the disclosure provides a device of generating an image stream having verification data. In an embodiment, the device includes a memory unit and an encoding unit. The encoding unit is electrically connected to the memory unit. The memory unit stores a first encoding parameter, a second encoding parameter, and the verification data. The encoding unit determines at least one pixel in a first image according to the first encoding parameter, generates a timing data sequence associated with information about correlation between time points and the verification data according to the second encoding parameter and the verification data, modifies a pixel value of the at least one pixel in the first image to generate a second image according to the verification data corresponding to one of the time points in the timing data sequence, and generates a image stream including the second image.

According to one or more embodiments, the disclosure provides a method of decoding an image stream having verification data. In an embodiment, the method includes the following steps. Obtain an image stream. Detect at least one pixel according to variations of third images in the image stream. Acquire a timing data sequence according to a third encoding parameter and a variation of a pixel value of the at least one pixel. Acquire the verification data according to a fourth encoding parameter and the timing data sequence. Acquire an image stream.

According to one or more embodiments, the disclosure provides a device of decoding an image stream having verification data. In an embodiment, the device includes a memory unit, an image capturing unit, and a decoding unit. The memory unit stores a third encoding parameter, a fourth encoding parameter, an image stream, and the verification data. The image capturing unit is electrically connected to the memory unit and captures the image stream. The decoding unit is electrically connected to the memory unit. The decoding unit detects at least one pixel according to variations of third images in the image stream, acquires a timing data sequence according to the third encoding parameter and a variation of a pixel value of the at least one pixel, and acquires the verification data according to the fourth encoding parameter and the timing data sequence.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
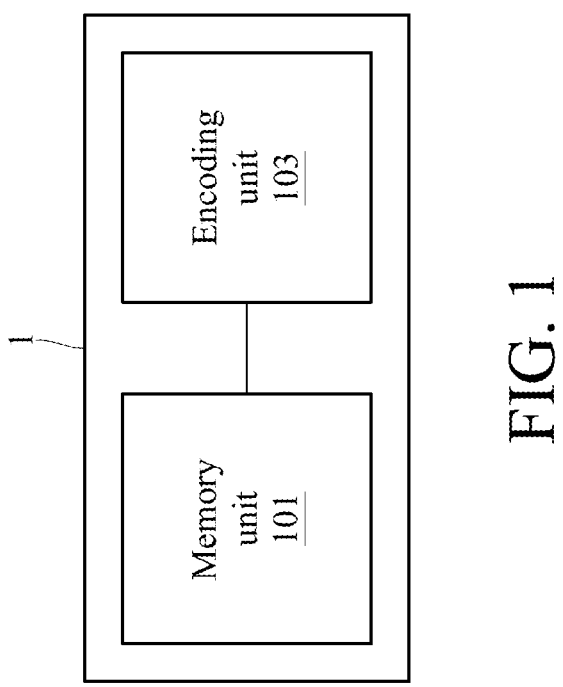
FIG. 1 is a schematic diagram of a device of generating image streams having respective verification data in an embodiment.

Please refer to FIG. 1, which is a schematic diagram of a device 1 of generating image streams having respective verification data in an embodiment. The device 1 includes a memory unit 101 and an encoding unit 103. The memory unit 101 stores a first encoding parameter, a second encoding parameter and at least one piece of verification data.

The encoding unit 103 is electrically connected to the memory unit 101. The encoding unit 103 determines at least one pixel in a first image according to the first encoding parameter, generates a timing data sequence associated with information about correlation between time points and the verification data according to the second encoding parameter and the at least one piece of verification data, modifies a pixel value (e.g. a grayscale value or color or the like) of the at least one pixel in a first image to generate a second image according to the at least one piece of verification data corresponding to one of the time points in the timing data sequence, and generates a image stream including the second image.

In an embodiment, the first encoding parameter is a pixel parameter, and the second encoding parameter is a time parameter. The first encoding parameter and the second encoding parameter are generated by performing a function transition on a preset value according to time information, or are received by a transmission method after randomly being generated. The transmission method is, for example, but not limited to, a wireless transmission, a wired transmission, a file transmission or a keyboard input.

For example, the device 1 is, not limited to, a mobile phone, a server, a computer or a possible electronic device with a computing function. In an embodiment based on the device 1 as a server, when a user attempts to obtain an image stream, the server generates an image stream and sends it to the user so that follow-up users can use the obtained image stream for verification.

Figure 2:
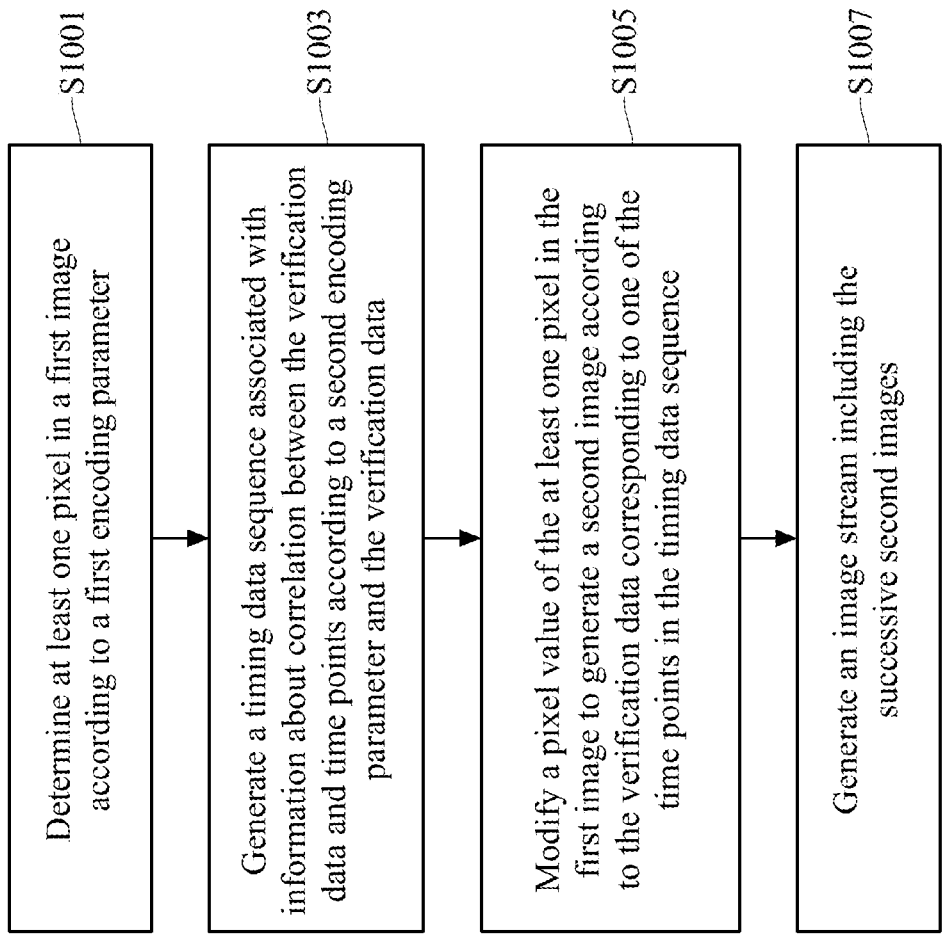
FIG. 2 is a flow chart of a method of generating image streams having respective verification data in an embodiment.

Please refer to FIG. 2, which is a flow chart of a method of generating image streams having respective verification data in an embodiment. The method includes the following steps. In step S1001, determine at least one pixel in a first image according to a first encoding parameter. In step S1003, generate a timing data sequence associated with information about correlation between time points and the verification data according to the second encoding parameter and the at least one piece of verification data.

In step S1005, chronologically modify a pixel value (e.g. a grayscale value, color or the like) of at least one pixel in a first image to generate a second image according to the at least one piece of verification data corresponding to each of the time points in the timing data sequence. The second images are successive. In step S1007, generate an image stream including the successive second images.

Figure 3:
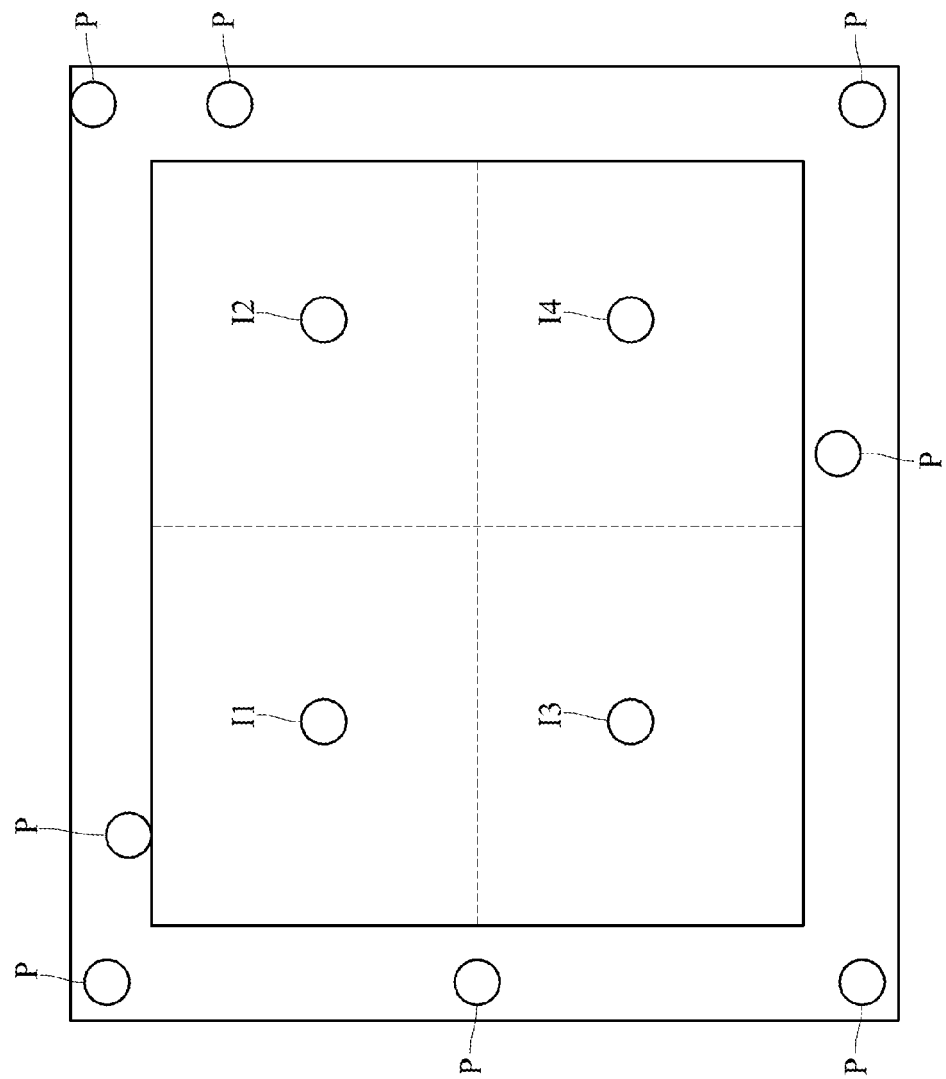
FIG. 3 is a schematic diagram of a first image in an embodiment.

For example, the following 4 bits data codes B1~B4 are exemplarily used to concisely illustrate the method of generating image streams having respective verification data. Please refer to FIG. 2, Tables 1, 2 and 3, and FIG. 3. Table 1 recites first encoding parameters in an embodiment, Table 2 recites second encoding parameters in an embodiment, and Table 3 recites verification data in an embodiment. FIG. 3 is a schematic diagram of a first image in an embodiment. The first image can be any possible image, such as an QR code, a two-dimensional bar code or a picture, and includes positioning points P and four data point positions I1~I4. The data point positions I1~I4 correspond to data codes B1~B4, respectively.

TABLE 1

|    | Data code |    |    |    |
|----|-----|-----|-----|-----|
| R1 | B1  | B2  | B3  | B4  |
| 1  | I1  | I2  | I3  | I4  |
| 2  | I2  | I1  | I4  | I3  |
| 3  | I4  | I3  | I1  | I2  |
| 4  | I3  | I1  | I4  | I2  |
| ... | ... | ... | ... | ... |

TABLE 2

|    | Time |    |    |    |    |    |
|----|------|------|------|------|------|------|
| R2 | t0   | t1   | t2   | t3   | t4   | t5   |
| 1  | 0.05 s | 0.05 s | 0.1 s  | 0.1 s  | 0.05 s | 0.05 s |
| 2  | 0.05 s | 0.1 s  | 0.05 s | 0.05 s | 0.1 s  | 0.05 s |
| 3  | 0.05 s | 0.05 s | 0.05 s | 0.15 s | 0.05 s | 0.05 s |
| 4  | 0.1 s  | 0.05 s | 0.05 s | 0.05 s | 0.1 s  | 0.05 s |
| ... | ... | ... | ... | ... | ... | ... |

TABLE 3

| Data code | Verification data |   |   |   |   |   |
|-----------|---|---|---|---|---|---|
| B1 | 0 | 0 | 1 | 1 | 0 | 1 | ... |
| B2 | 0 | 0 | 1 | 0 | 1 | 1 | ... |
| B3 | 0 | 1 | 1 | 0 | 0 | 1 | ... |
| B4 | 0 | 1 | 0 | 1 | 0 | 1 | ... |

Figure 4:
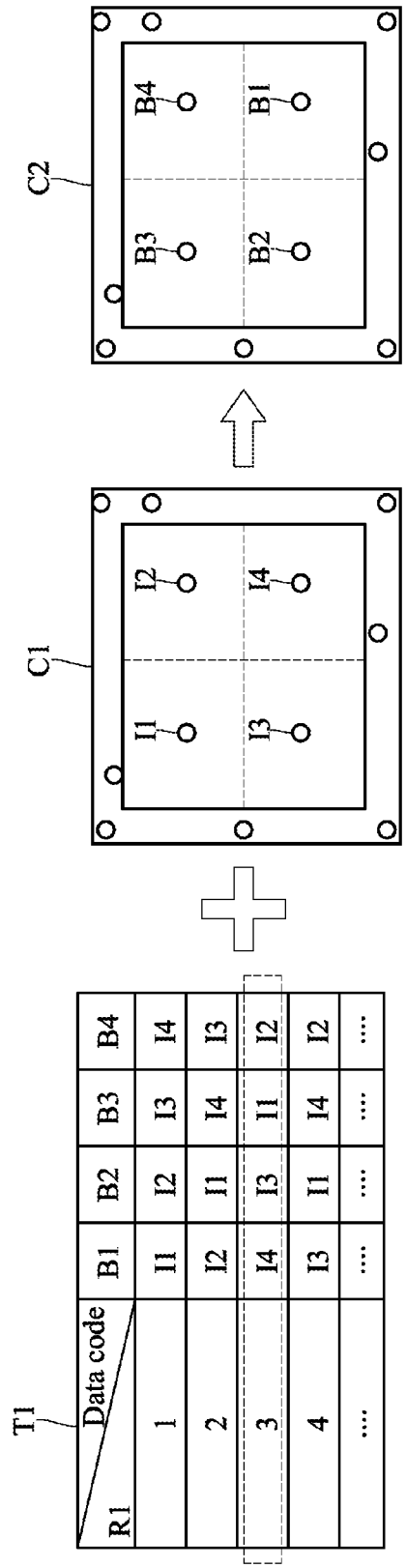
FIG. 4 is a schematic diagram of determining a relationship between a data code and the position of a data point in the first image according to a first encoding parameter in an embodiment.

In step S1001, determine the relationship between the data point positions I1~I4 and the data codes B1~B4 in the first image according to the first encoding parameter, e.g. R1=3, in Table 1. The data code B1 corresponds to the data point position I4, the data code B2 corresponds to the data point position I3, the data code B3 corresponds to the data point position I1, and the data code B4 corresponds to the data point position I2. Please refer to FIG. 4, which is a schematic diagram of determining a relationship between a data code and the position of a data point in the first image according to a first encoding parameter in an embodiment. As shown in FIG. 4, the first image C1 is used to generate a correlation image C2 according to the first encoding parameter T1.

Figure 5:
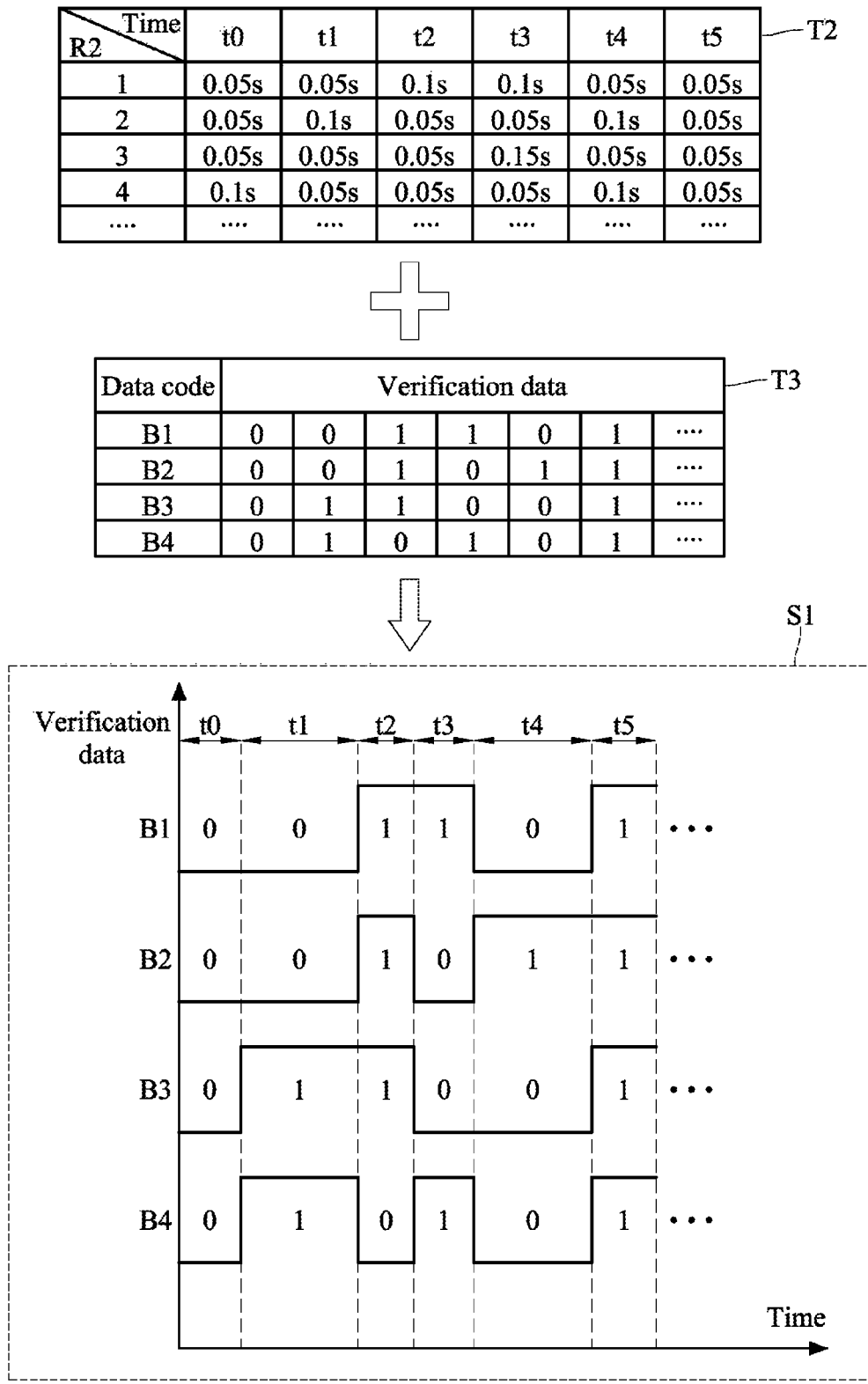
FIG. 5 is a schematic diagram of generating a timing data sequence according to a second encoding parameter and verification data in an embodiment.

In step S1003, generate the timing data sequence associated with the information about correlation between time points t0~t5 and the verification data according to the second encoding parameter in Table 2 and the verification data in Table 3. Please refer to FIG. 5, which is a schematic diagram of generating a timing data sequence according to a second encoding parameter and verification data in an embodiment. As shown in FIG. 5, the timing data sequence S1 is generated according to the second encoding parameter T2 in Table 2 and the verification data T3 in Table 3. When the second encoding parameter R2=2 for example, the bit signal at the time point t0 continues for 0.05 seconds, the bit signal at the time point t1 continues for 0.1 seconds, the bit signal at the time point t2 continues for 0.05 seconds, the bit signal at the time point t3 continues for 0.05 seconds, the bit signal at the time point t4 continues for 0.1 seconds, and the bit signal at the time point t5 continues for 0.05 seconds.

Figure 6:
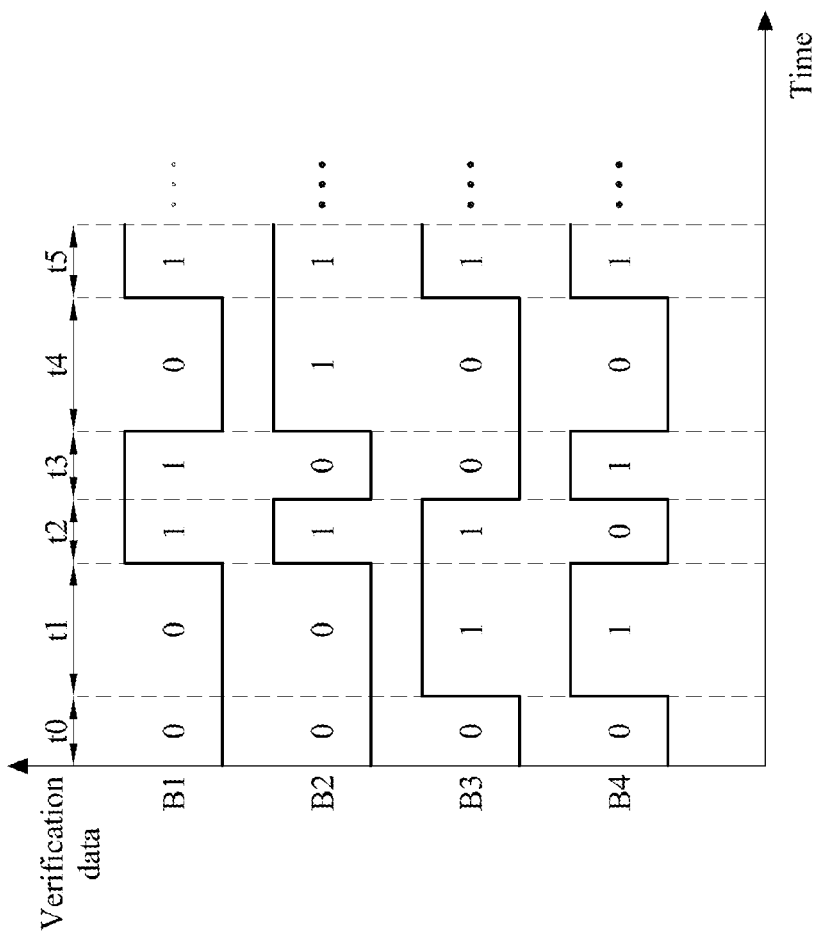
FIG. 6 is a schematic diagram of a timing data sequence in an embodiment.

Herein, the timing data sequence is generated as shown in FIG. 6, which is a schematic diagram of a timing data sequence in an embodiment. For example, as described with respect to FIG. 6 and Table 3, the data code B1 corresponds to the bit sequence (0,0,1,1,0,1). Therefore, in view of the progression times starting from the time points t0~t5, the bit signal of the data code B1 at the time point t0 is 0 and continues for 0.05 seconds, the bit signal of the data code B1 at the time point t1 is 0 and continues for 0.1 seconds, the bit signal of the data code B1 at the time point t2 is 1 and continues for 0.05 seconds, the bit signal of the data code B1 at the time point t3 is 1 and continues for 0.05 seconds, the bit signal of the data code B1 at the time point t4 is 0 and continues for 0.1 seconds, and the bit signal of the data code B1 at the time point t5 is 1 and continues for 0.05 seconds. The bit signals of the data code B2~B4 can be deduced by analogy.

Figure 7:
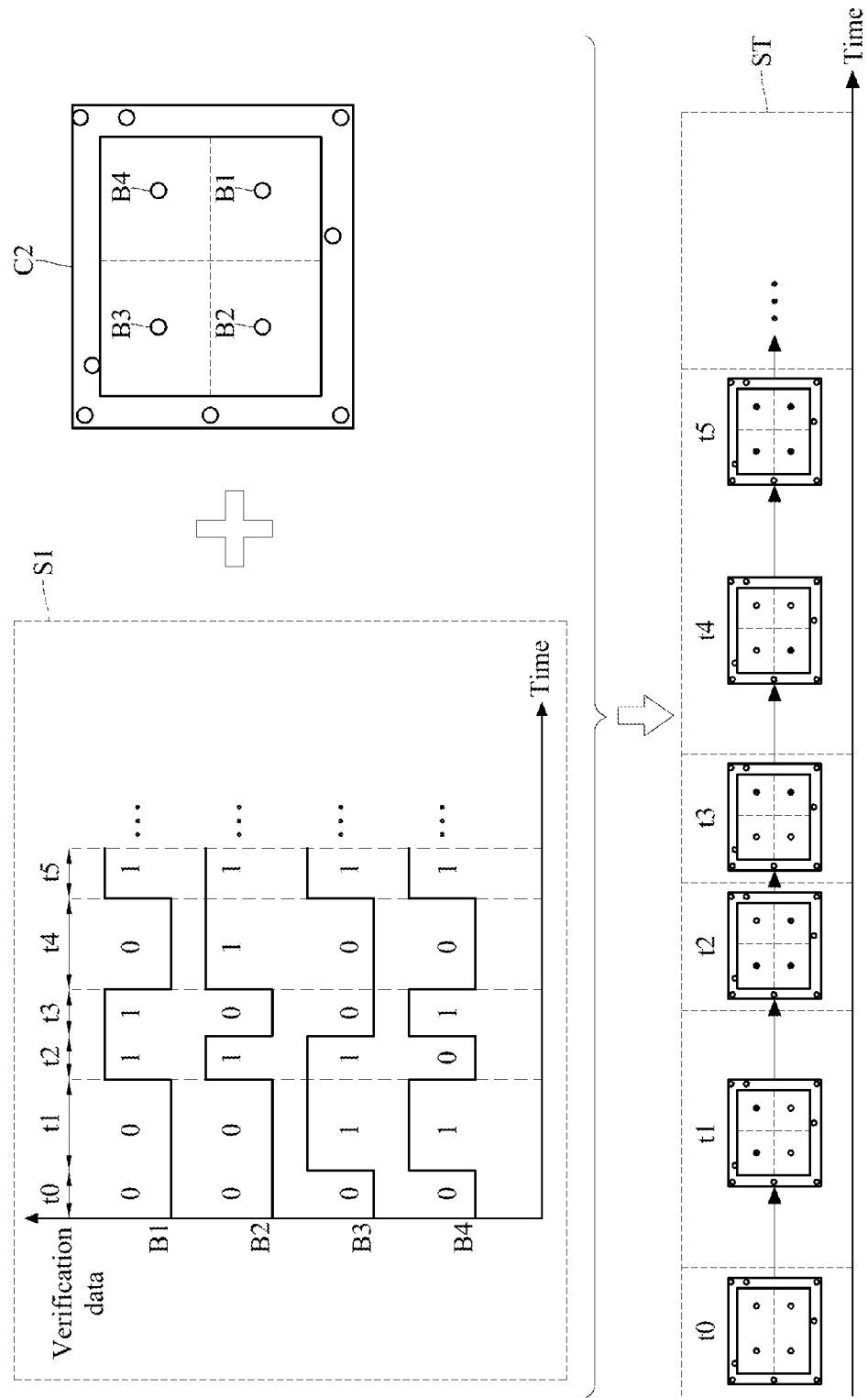
FIG. 7 is a schematic diagram of generating successive second images by chronologically modifying the pixel value of each pixel in the first image in an embodiment.

In step S1005, chronologically modify pixel values of the pixels I1~I4 in the first image to generate successive second images according to the verification data corresponding to each of the time points in the above timing data sequence. These successive second images are shown, for example, in FIG. 7, which is a schematic diagram of generating successive second images by chronologically modifying the pixel value of each pixel in the first image in an embodiment. As shown in FIG. 7, an image stream ST of the successive second images is generated by referring to the relationship between the timing data sequences S1 and C2. In this embodiment, if the bit signal is 0, the pixel corresponding to the bit signal is a dark point; and if the bit signal is 1, the pixel corresponding to the bit signal is a bright point. The pixel value of the bright point and the pixel value of the dark point can be designed according to actual requirements. For example, the pixel value of the bright point is 200, and the pixel value of the dark point is 100. When the pixel value of the pixel changes according to the bit signal, the human's eyes may not sense it but the device can. Therefore, the disclosure may keep information confidential.

Figure 8:
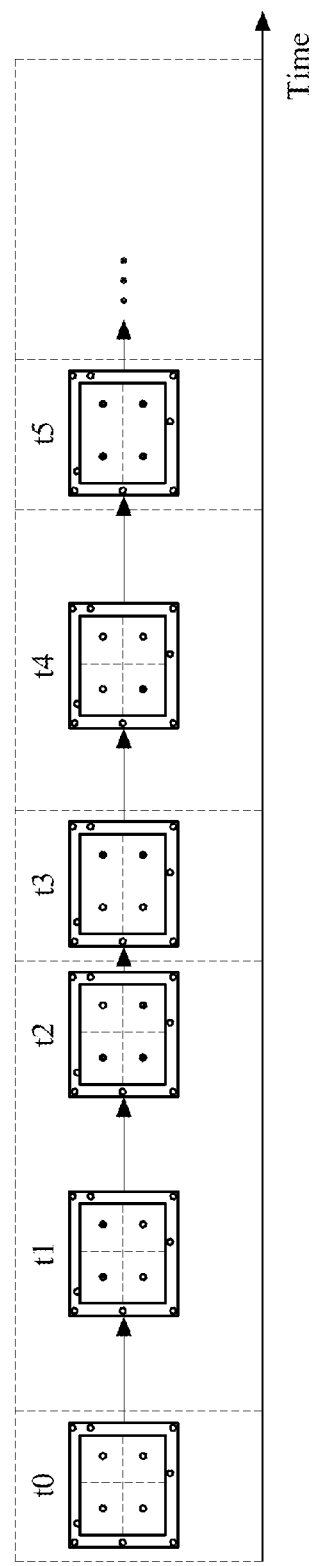
FIG. 8 is a schematic diagram of generating the successive second images in an embodiment.

Please refer to FIG. 3 and FIG. 8. FIG. 8 is a schematic diagram of generating the successive second images in an embodiment. In view of the relationship between the bits B1~B4 and the data point positions I1~I4 in step S1001, the sequence of the data codes B1~B4 in the verification data at the time point t0 is (0,0,0,0) so that the display sequence of the data point positions I1~I4 in the first one of the second images is (0,0,0,0) and will be displayed by the sequence of the pixel values (100,100,100,100) for 0.05 seconds, respectively. Similarly, the sequence of the data codes B1~B4 in the verification data at the time point t1 is (0,0,1,1) so that the display sequence of the data point positions I1~I4 in the second one of the second images is (1,1,0,0) and will be displayed by the sequence of the pixel values (200,200,100,100) for 0.1 seconds, respectively.

The sequence of the data codes B1~B4 in the verification data at the time point t2 is (1,1,1,0) so that the display sequence of the data point positions I1~I4 in the third one of the second images is (1,0,1,1) and will be displayed by the sequence of the pixel values (200,100,200,200) for 0.05 seconds, respectively. The sequence of the data codes B1~B4 in the verification data at the time point t3 is (1,0,0,1), so the display sequence of the data point positions I1~I4 in the fourth one of the second images is (0,1,0,1) and will be displayed by the sequence of the pixel values (100,200,100,200) for 0.05 seconds, respectively. The sequence of the data codes B1~B4 in the verification data at the time point t4 is (0,1,0,0), so the display sequence of the data point positions I1~I4 in the fifth one of the second images is (0,0,1,0) and will be displayed by the sequence of the pixel values (100,100,200,100) for 0.1 seconds, respectively. The sequence of the data codes B1~B4 in the verification data at the time point t5 is (1,1,1,1), so the display sequence of the data point positions I1~I4 in the sixth one of the second images is (1,1,1,1) and will be displayed by the sequence of the pixel values (200,200,200,200) for 0.05 seconds, respectively. Eventually, in step S1007, the image stream is generated and includes the above six successive second images.

In another embodiment, the method of generating image streams having respective verification data further includes loading an original image stream that includes the first images. Moreover, the step of generating the second images by modifying the pixel value of at least one pixel in each of the first images further includes chronologically modifying the pixel value of at least one pixel in each of the first images to generate the successive second images according to the at least one piece of verification data corresponding to each of the time points. The image stream herein further includes the successive second images.

For example, because the first image is a static image in an embodiment, and is an image stream including multiple images in another embodiment. That is, the method of generating image streams having respective verification data also allows encoding is performed in a dynamic image stream to generate an image stream for verification.

Figure 9:
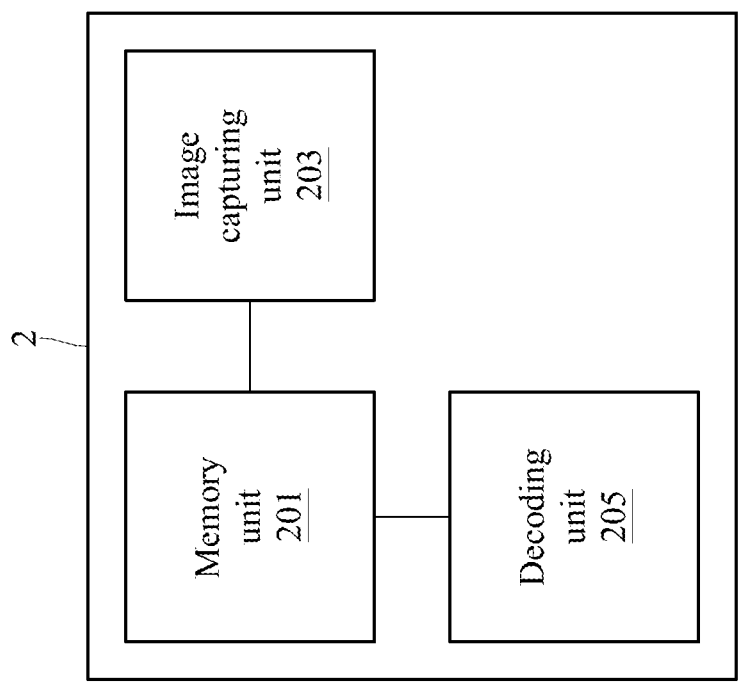
FIG. 9 is a schematic diagram of a device of decoding image streams having respective verification data in an embodiment.

Please refer to FIG. 9. FIG. 9 is a schematic diagram of a device 2 of decoding image streams having respective verification data in an embodiment. The device 2 includes a memory unit 201, an image capturing unit 203, and a decoding unit 205. The memory unit 201 stores a third encoding parameter, a fourth encoding parameter, an image stream, and at least one piece of verification data. The image capturing unit 203 is electrically connected to the memory unit 201 and captures the image stream. The decoding unit 205 is electrically connected to the memory unit 201. The decoding unit 205 detects at least one pixel according to variations of third images in the image stream, acquires a timing data sequence according to the third encoding parameter and a variation of a pixel value of the at least one pixel, and acquires the at least one piece of verification data according to the fourth encoding parameter and the timing data sequence.

For example, the device 2 is not limited to a mobile phone, a server, a computer, or any possible electronic device with a computing function. In an embodiment with respect to the device 2 as a tablet computer, when a user device displays an image stream to be verified, the tablet computer may use its camera to capture this image stream and then decode and verify this image stream. Therefore, the user can use this image stream to achieve the verification function.

Figure 10:
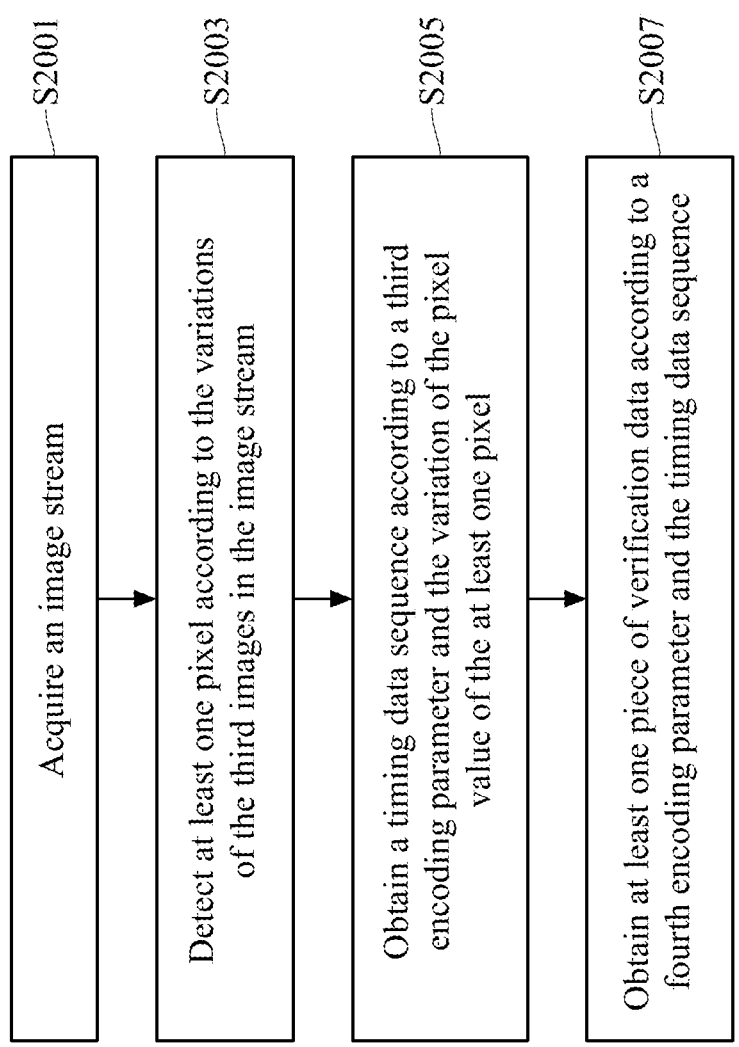
FIG. 10 is a flow chart of a method of decoding image streams having respective verification data in an embodiment.

Please refer to FIG. 10. FIG. 10 is a flow chart of a method of decoding image streams having respective verification data in an embodiment. The method includes the following steps. In step S2001, acquire an image stream. In step S2003, detect at least one pixel according to the variations of the third images in the image stream. In step S2005, obtain a timing data sequence according to a third encoding parameter and the variation of the pixel value of the at least one pixel. In step S2007, obtain at least one piece of verification data according to a fourth encoding parameter and the timing data sequence.

In an embodiment, the third encoding parameter is a pixel parameter, and the fourth encoding parameter is a time parameter. The third encoding parameter and the fourth encoding parameter are generated by performing function transition on a preset value according to time information, or are received by a transmission method after randomly being generated. The transmission method herein is, for example, but not limited to, a wireless transmission, a wired transmission, a file transmission or a keyboard input.

Figure 11:
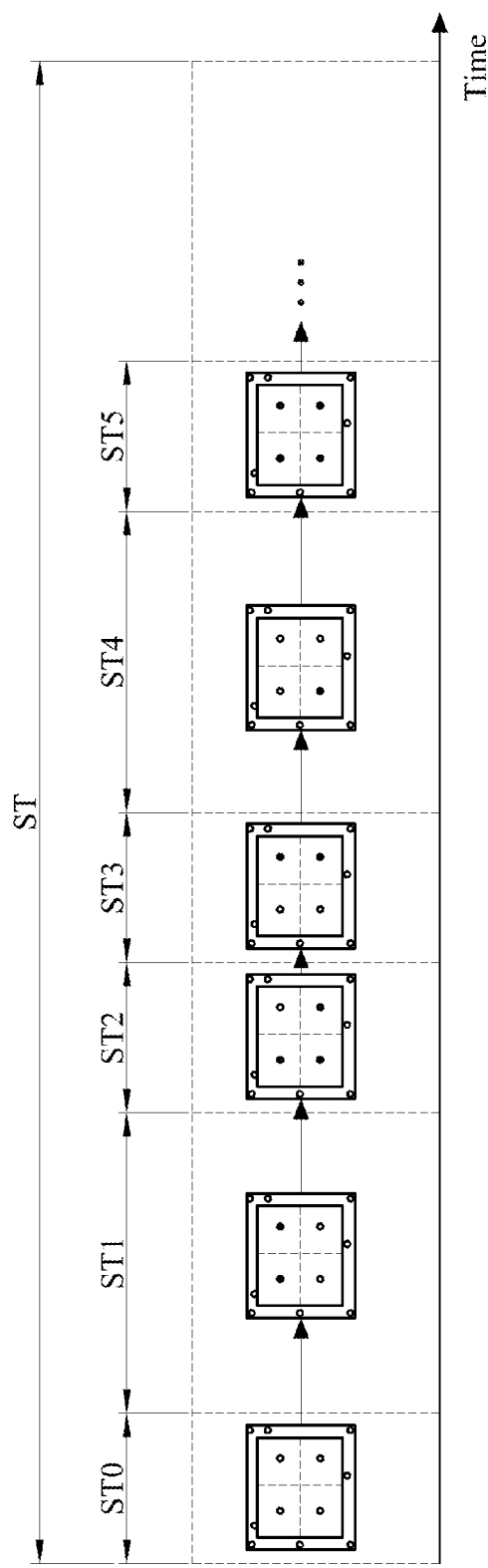
FIG. 11 is a schematic diagram of the acquired image stream in an embodiment.
Figure 12:
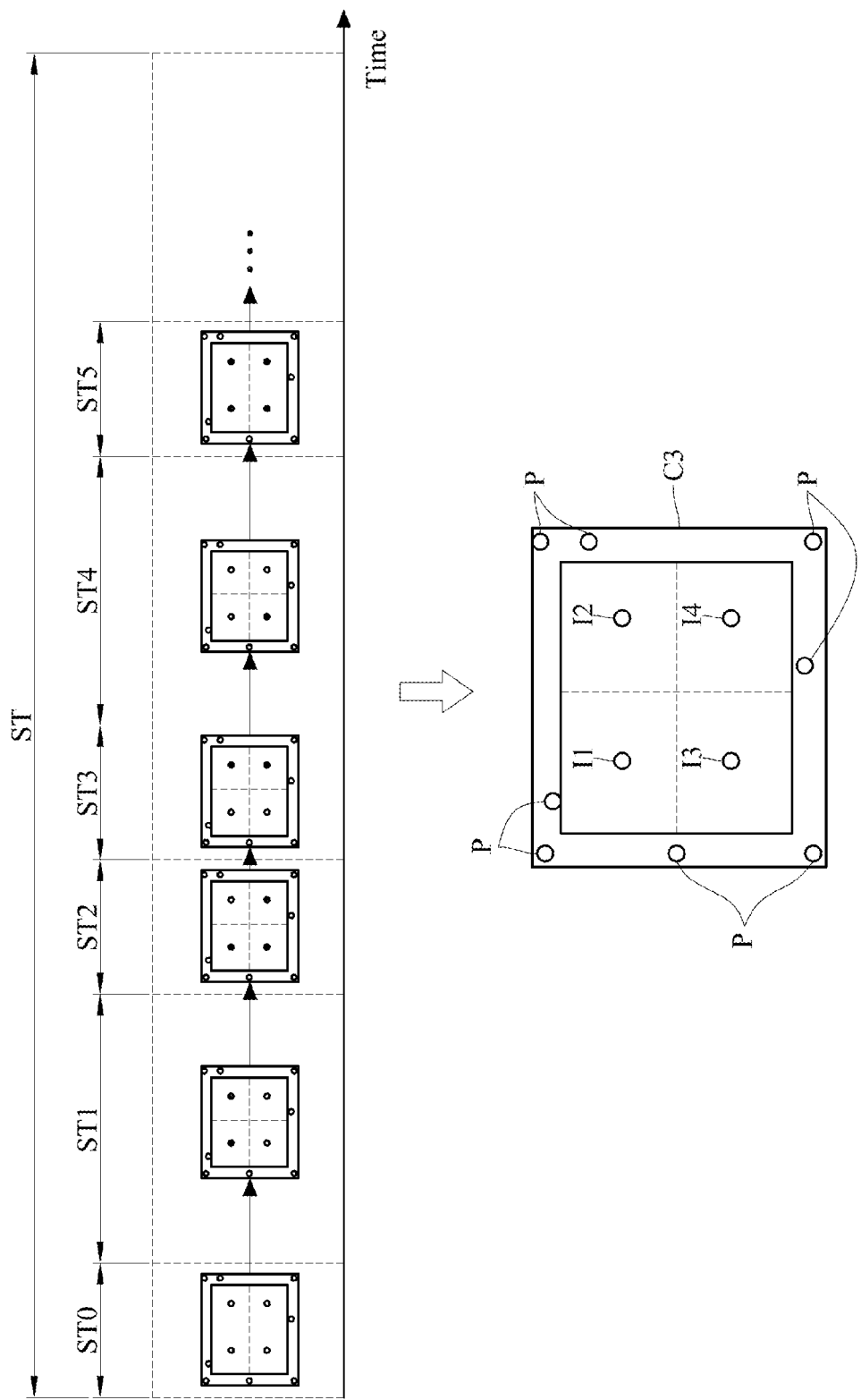
FIG. 12 is a schematic diagram of the acquired and verified third images in an embodiment.

For example, as described with FIG. 11, which is a schematic diagram of the acquired image stream in an embodiment, an image stream ST is acquired in step S2001. In step S2003, an image recognition technology is used to detect at least one pixel according to the variations of the third images ST0~ST5 in the image stream ST. As shown in FIG. 12, which is a schematic diagram of the acquired and verified third images in an embodiment, the third image C3 is acquired from the image stream ST. After verified, the third image C3 has positioning points P and four data point positions I1~I4, and the data point positions I1~I4 correspond to the data codes B1~B4, respectively.

TABLE 4

| | | Data code | | |
|---|---|---|---|---|
| R1 | B1 | B2 | B3 | B4 |
| 1 | I1 | I2 | I3 | I4 |
| 2 | I2 | I1 | I4 | I3 |
| 3 | I4 | I3 | I1 | I2 |
| 4 | I3 | I1 | I4 | I2 |
| ... | ... | ... | ... | ... |

TABLE 5

| | Time | | | | | |
|---|---|---|---|---|---|---|
| R2 | t0 | t1 | t2 | t3 | t4 | t5 |
| 1 | 0.05 s | 0.05 s | 0.1 s | 0.1 s | 0.05 s | 0.05 s |
| 2 | 0.05 s | 0.1 s | 0.05 s | 0.05 s | 0.1 s | 0.05 s |
| 3 | 0.05 s | 0.05 s | 0.05 s | 0.15 s | 0.05 s | 0.05 s |
| 4 | 0.1 s | 0.05 s | 0.05 s | 0.05 s | 0.1 s | 0.05 s |
| ... | ... | ... | ... | ... | ... | ... |

Figure 13:
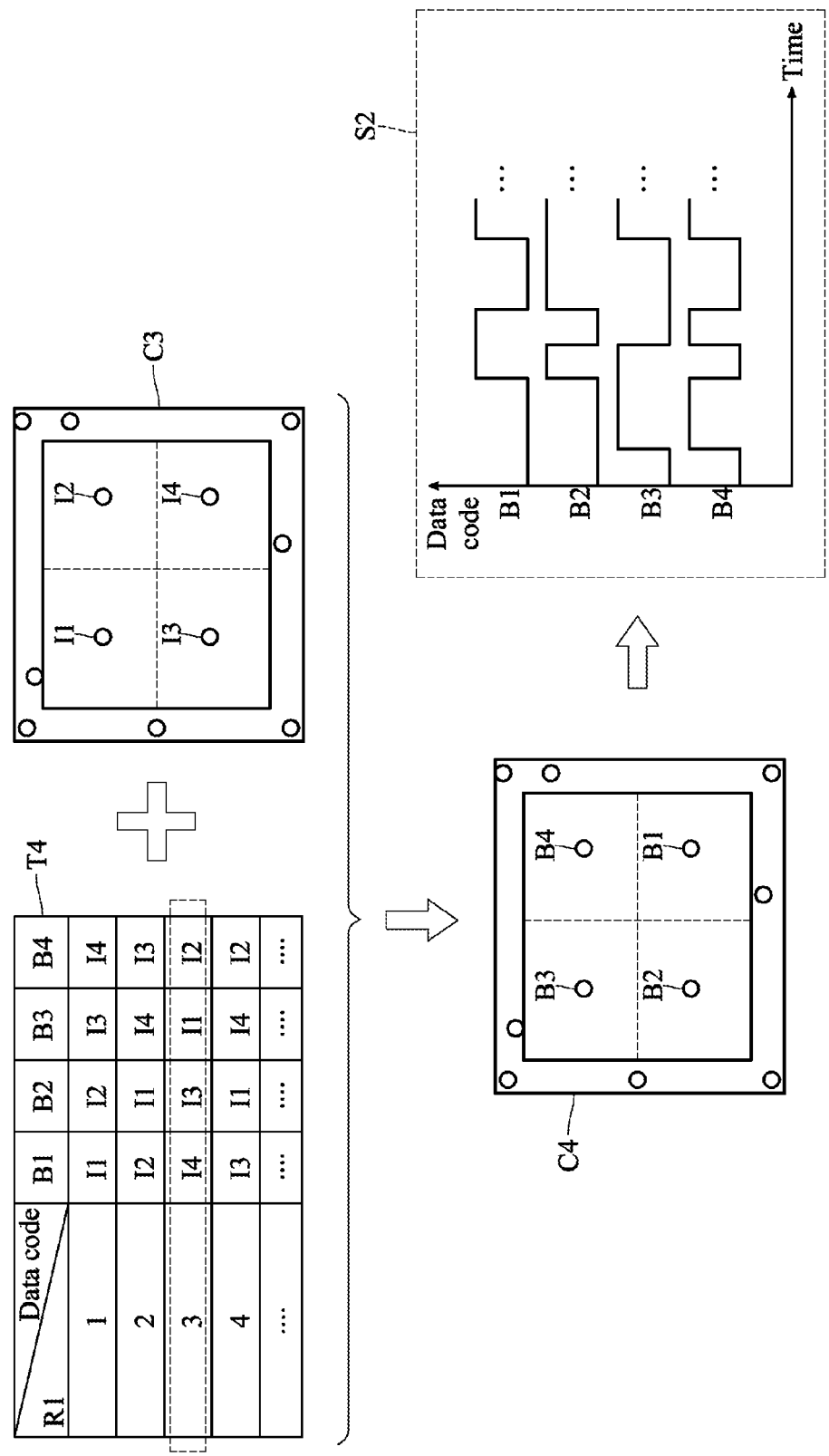
FIG. 13 is a schematic diagram of acquiring a timing data sequence in an embodiment.

In step S2005 with respect to the third encoding parameter R1=3 in Table 4, the data code B1 corresponds to the data point position I4, the data code B2 corresponds to the data point position I3, the data code B3 corresponds to the data point position I1, and the data code B4 corresponds to the data point position I2. Then, a timing data sequence is obtained according to the variations of the pixel values of the data point positions I1~I4. If the pixel belongs to a dark point, its bit signal is 0. If the pixel belongs to a bright point, its bit signal is 1. The pixel value of the bright point and the pixel value of the dark point can be designed according to actual requirements. For example, the pixel value of a bright point is 200, and the pixel value of a dark point is 100. Please refer to FIG. 13. FIG. 13 is a schematic diagram of acquiring a timing data sequence in an embodiment. As described in FIG. 13, according to the third encoding parameter T4 in Table 4 and the verified third image C3, a correlation image C4 showing the data codes B1~B4 on the third image C3 can be obtained to figure out the bit signal S2 of each of the data codes B1~B4 at different time points.

Figure 14:
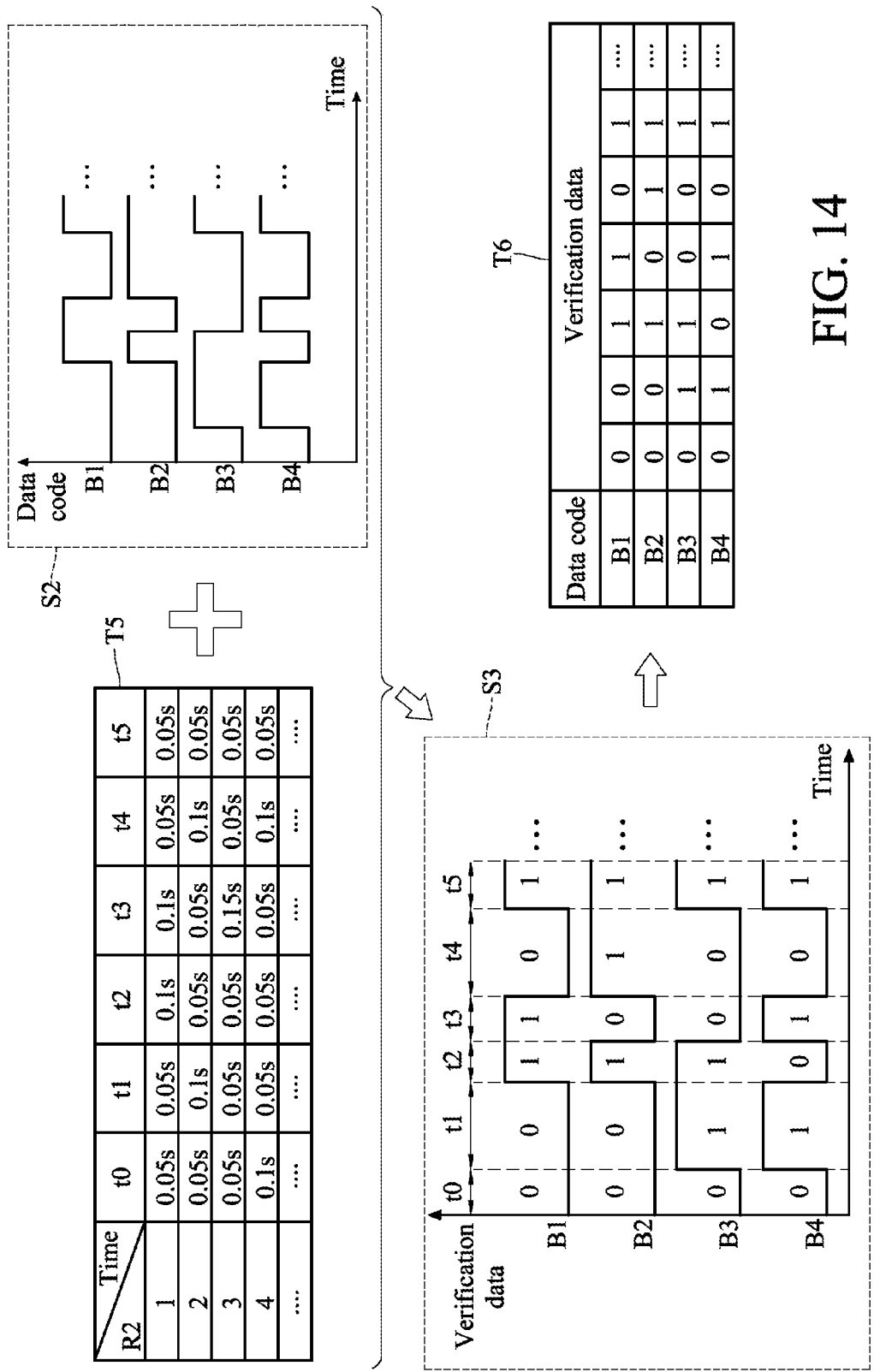
FIG. 14 is a schematic diagram of decoding a timing data sequence to obtain verification data in an embodiment.

In step S2007, the at least one piece of verification data can be obtained according to a fourth encoding parameter T5 in Table 5 and the timing data sequence. In an embodiment with respect to the fourth encoding parameter R2=2, the bit signal at the time point t0 progresses for 0.05 seconds, the bit signal at the time point t1 progresses for 0.1 seconds, the bit signal at the time point t2 progresses for 0.05 seconds, the bit signal at the time point t3 progresses for 0.05 seconds, the bit signal at the time point t4 progresses for 0.1 seconds, and the bit signal at the time point t5 progresses for 0.05 seconds. Due to the above correlation image C4, the timing data sequence can be decoded to obtain verification data, as shown in FIG. 14. According to the fourth encoding parameter T5 in Table 5 and the bit signals S2, the bit signals S3 indicating time information can be obtained. After the bit signals S3 are decode D, the verification data T6 in Table 6 can be obtained. Therefore, users can use such a verification data for verification.

TABLE 6

| Data code | Verification data | | | | | | |
|---|---|---|---|---|---|---|---|
| B1 | 0 | 0 | 1 | 1 | 0 | 1 | ... |
| B2 | 0 | 0 | 1 | 0 | 1 | 1 | ... |
| B3 | 0 | 1 | 1 | 0 | 0 | 1 | ... |
| B4 | 0 | 1 | 0 | 1 | 0 | 1 | ... |

Figure 15:
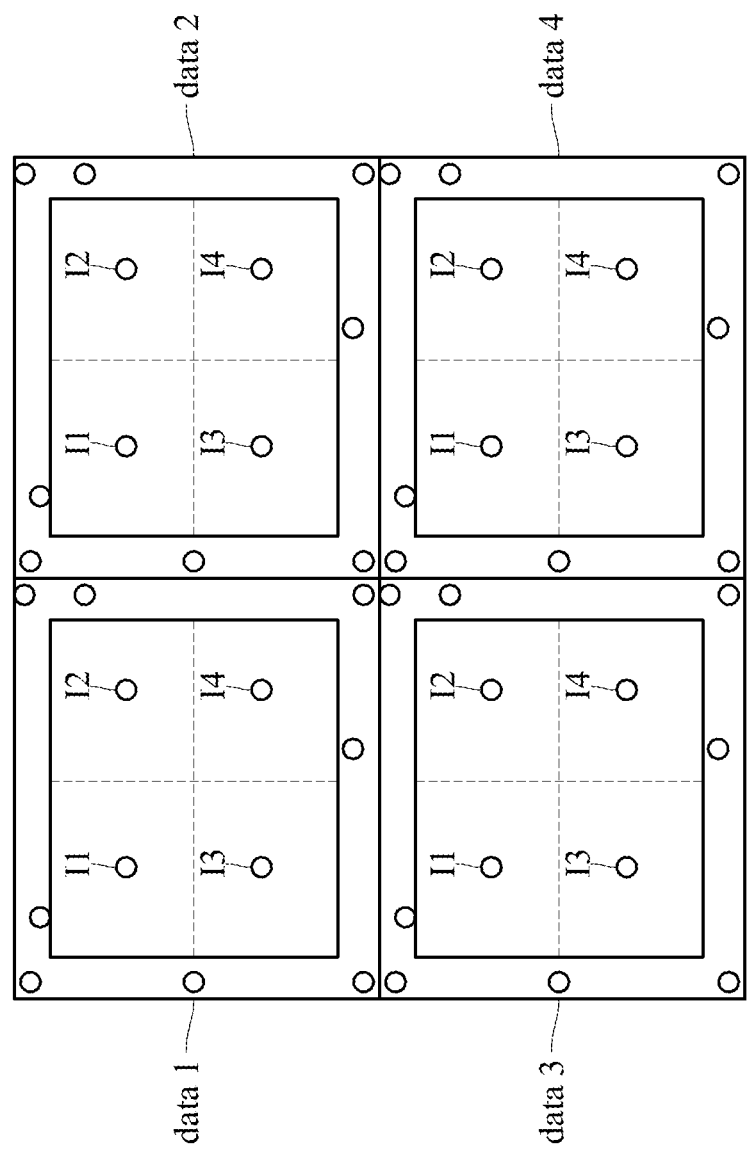
FIG. 15 is a schematic diagram of spatial encoding combinations in an embodiment.
Figure 16:
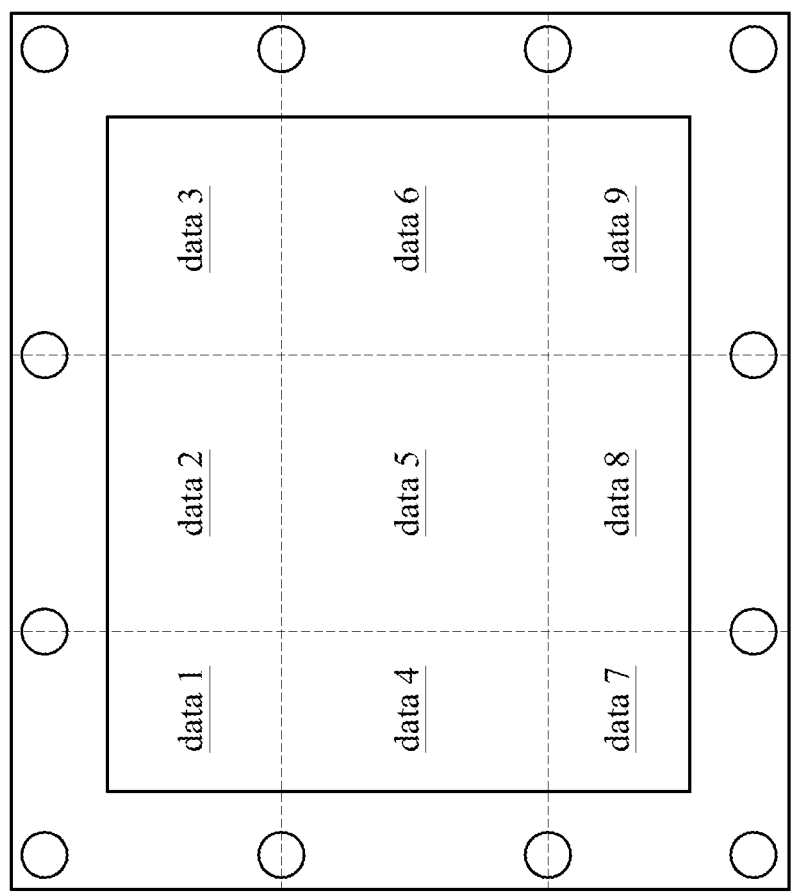
FIG. 16 is a schematic diagram of spatial encoding combinations in another embodiment.
Figure 17:
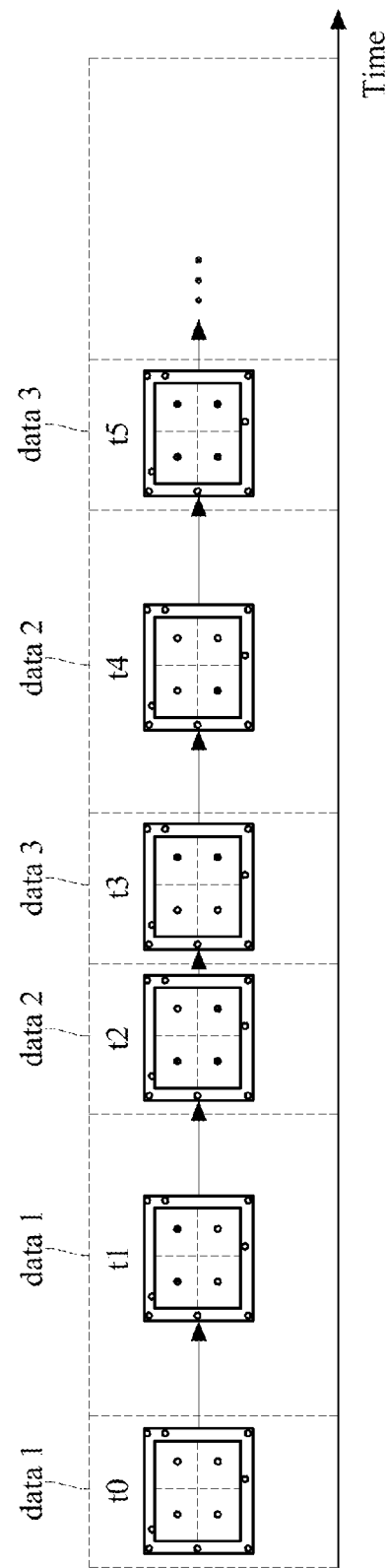
FIG. 17 is a schematic diagram of time encoding combinations in an embodiment.

In an embodiment, the verification data in the disclosure is generated by a multi-data encoding method, in which two or more than two pieces of data are encode D in space or time into the same image. In an embodiment, as described in FIG. 15, four pieces of verification data Data 1~4 are encoded into the first image. In another embodiment, as described in FIG. 16, verification data Data 1~9 are encoded at nine data point positions in the first image, respectively. In a yet another embodiment, as described in FIG. 17, the first verification data Data 1 is encoded at the time points t0 and t1, the second verification data Data 2 is encoded at the time points t2 and t4, and the third verification data Data 3 is enabled at the time points t3 and t5. In this way, multiple data can be encoded.

Figure 18:
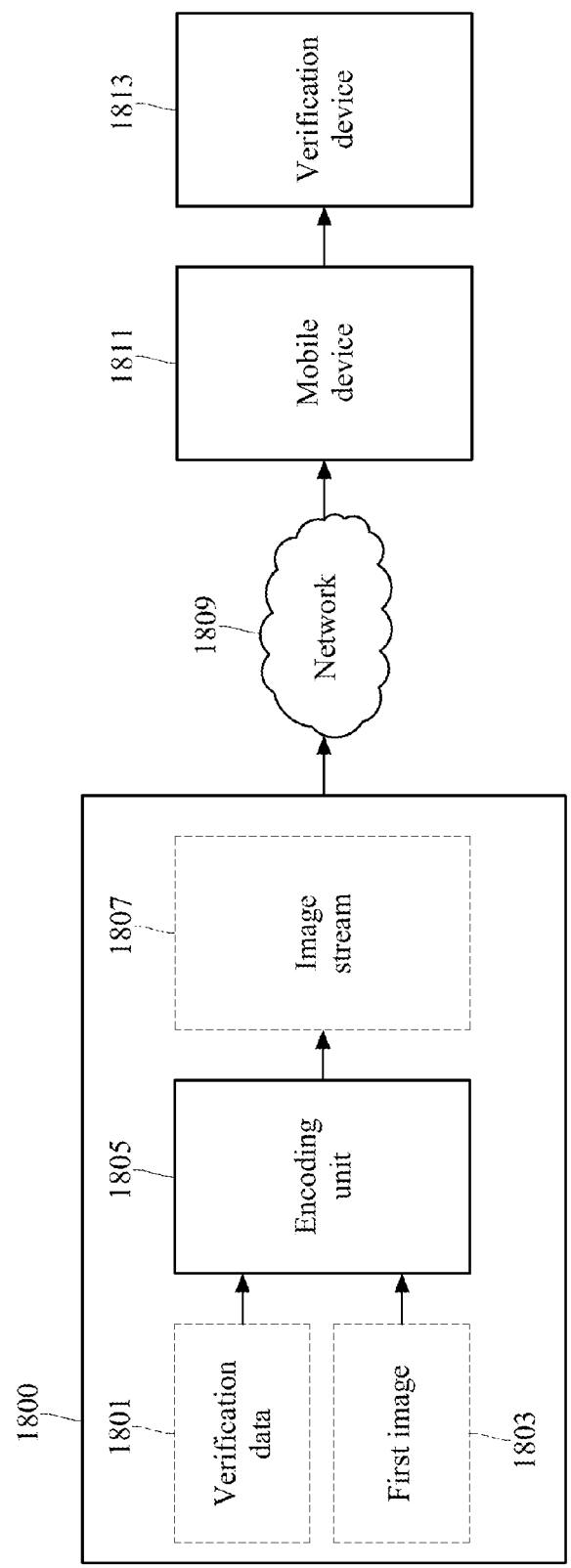
FIG. 18 is a schematic diagram of an electronic ticketing system in an embodiment.

In an embodiment, the method of generating image streams having respective verification data can be applied to an electronic ticking system. Please refer to FIG. 18, where an 1800 is shown. The electronic ticking system 1800 uses an encoding unit 1805 to encode verification data 1801 and a first image 1803 together to generate a image stream 1807 and uses a network 1809 to send this image stream 1807 to a user's mobile device, such as a mobile phone 1811. The mobile phone 1811 will show this image stream 1807 to a verification device 1813 for verification.

Figure 19:
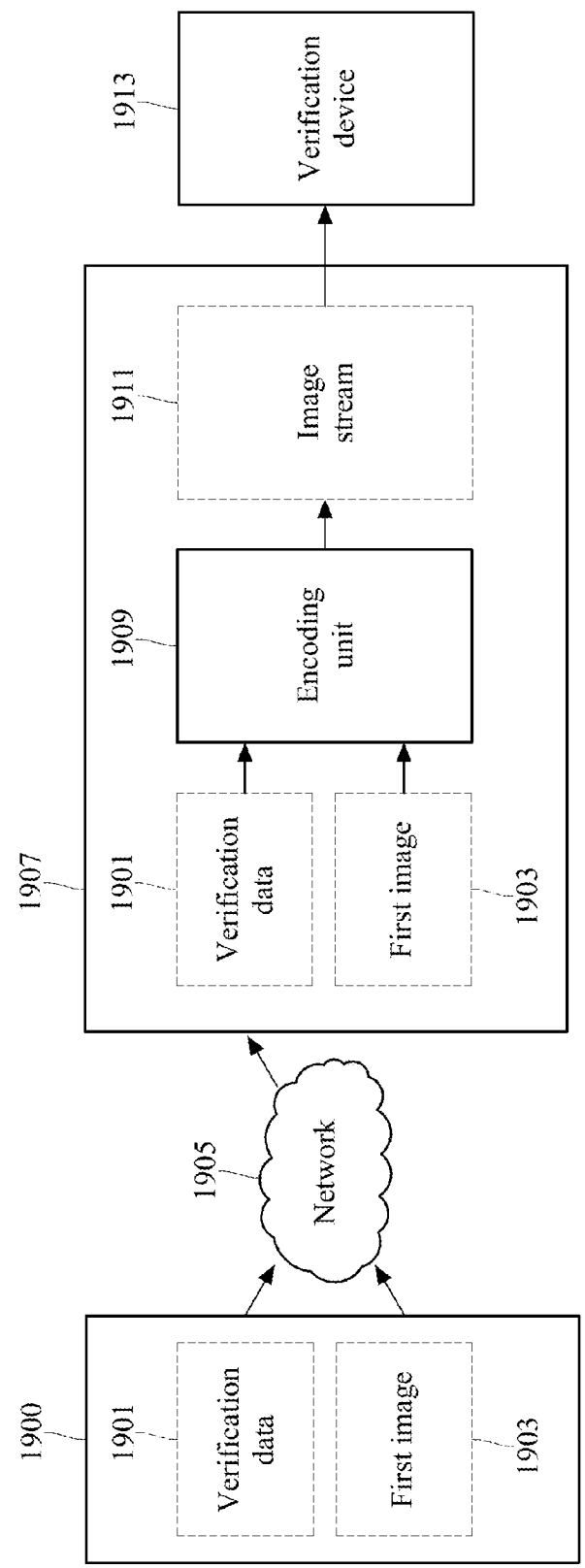
FIG. 19 is a schematic diagram of an electronic ticketing system in another embodiment.

In another embodiment, an electronic ticking system 1900 is shown in FIG. 19. The electronic ticking system 1900 uses a network 1905 to directly send the verification data 1901 and a first image 1903 to a user's mobile device, such as a mobile phone 1907. Then, the mobile phone 1907 uses its encoding unit 1909 to encode the verification data 1901 and the first image 1903 together to generate a image stream 1911, and then shows this image stream 1911 to a verification device 1913 for verification.

Figure 20:
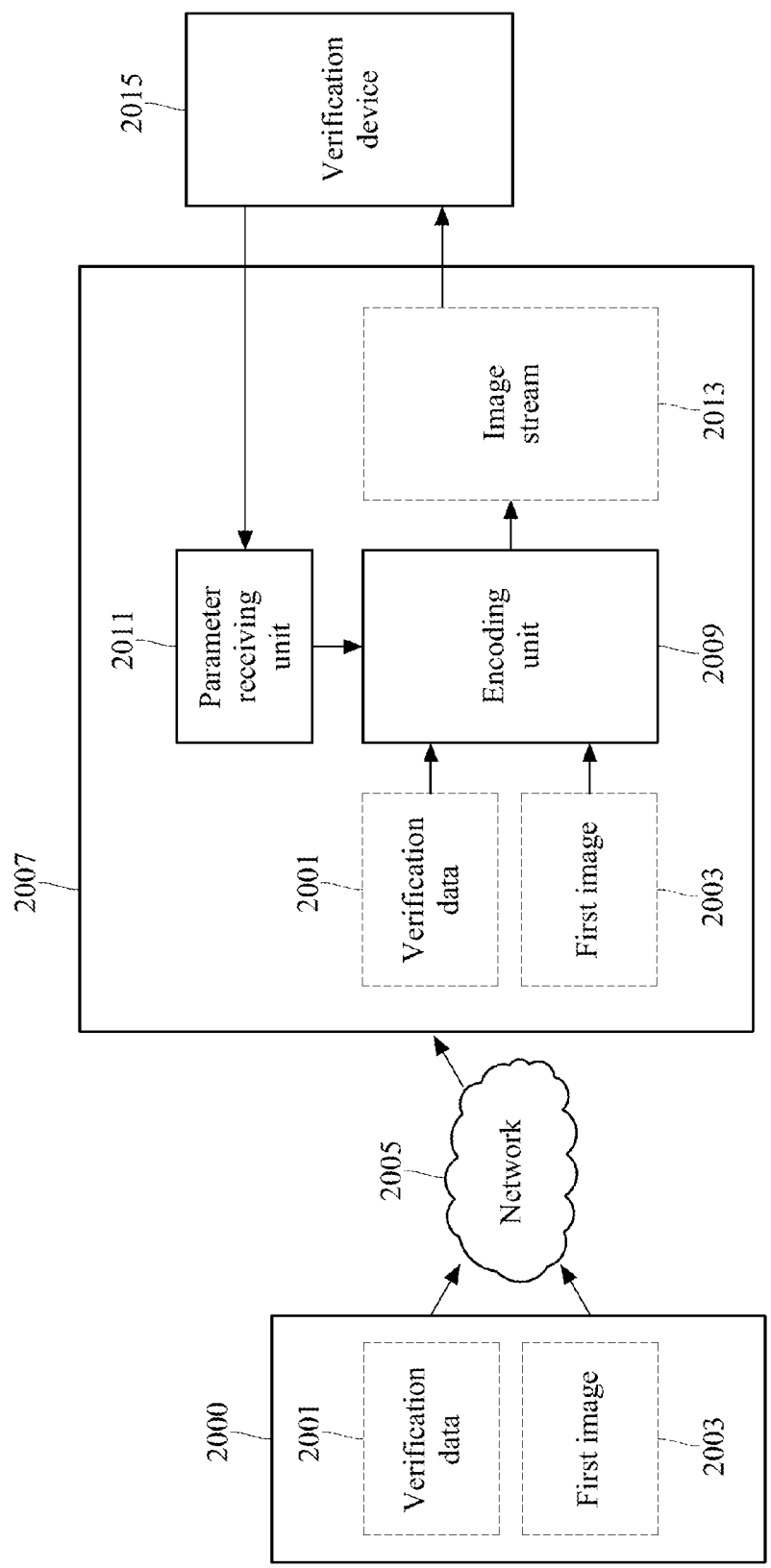
FIG. 20 is a schematic diagram of an electronic ticketing system in another embodiment.

In yet another embodiment, an electronic ticking system 2000 is shown in FIG. 20. The electronic ticking system 2000 uses a network 2005 to directly send verification data 2001 and a first image 2003 to a user's mobile device, such a mobile phone 2007. The mobile phone 2007 uses it parameter receiving unit 2011 to receive parameters from a verification device 2015, uses its encoding unit 2009 to encode the received data together to generate a image stream 2013, and shows this image stream 2013 to a verification device 2015 for verification.

Figure 21:
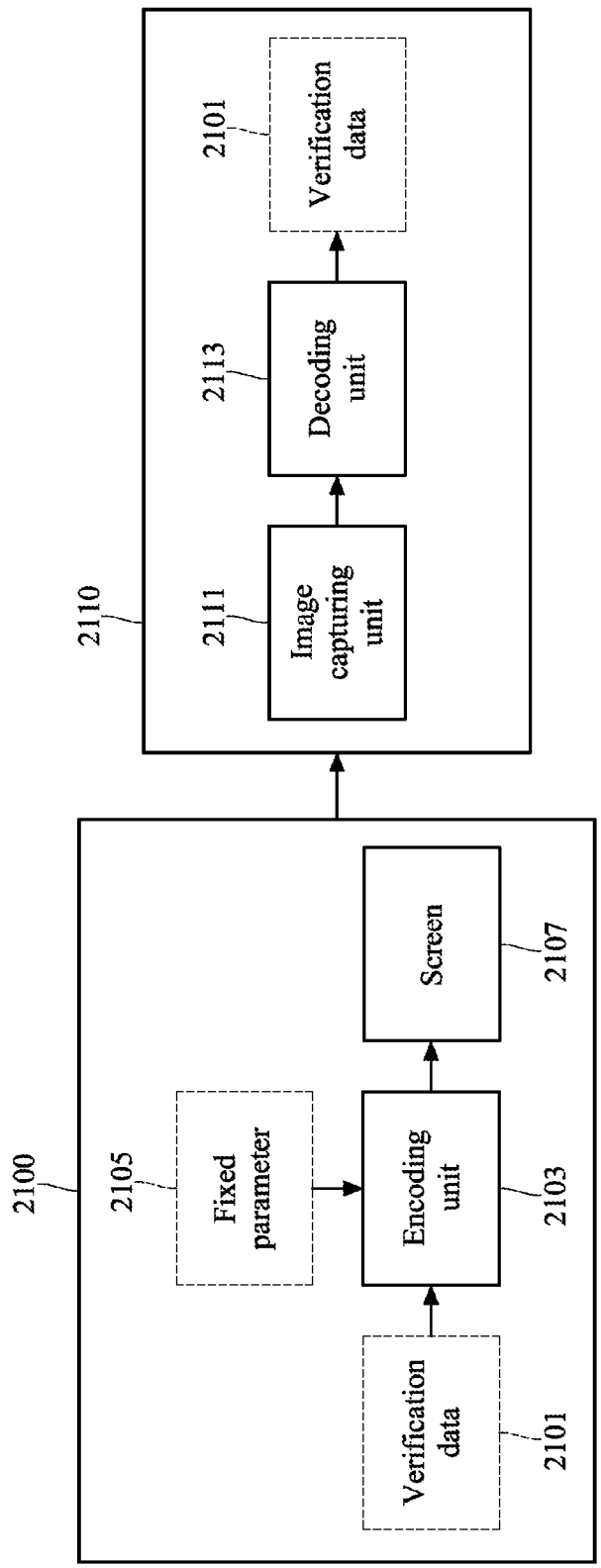
FIG. 21 is a schematic diagram of the data transmission between a user's mobile phone and a verification device in an embodiment.

In an embodiment, the data transmission between a user's mobile device, such as a mobile phone 2100, and a verification device 2110 can be worked out as shown in FIG. 21. Under a low-security data transmission mode, the mobile phone 2100 uses an encoding unit 2103 to encode verification data 2101 to generate an image stream according to a fixed parameter 2105 and shows this image stream on a screen 2107. The verification device 2110 uses an image capturing unit 2111 to capture this image stream and then uses a decoding unit 2113 to decode the captured image stream to obtain verification data 2101.

Figure 22:
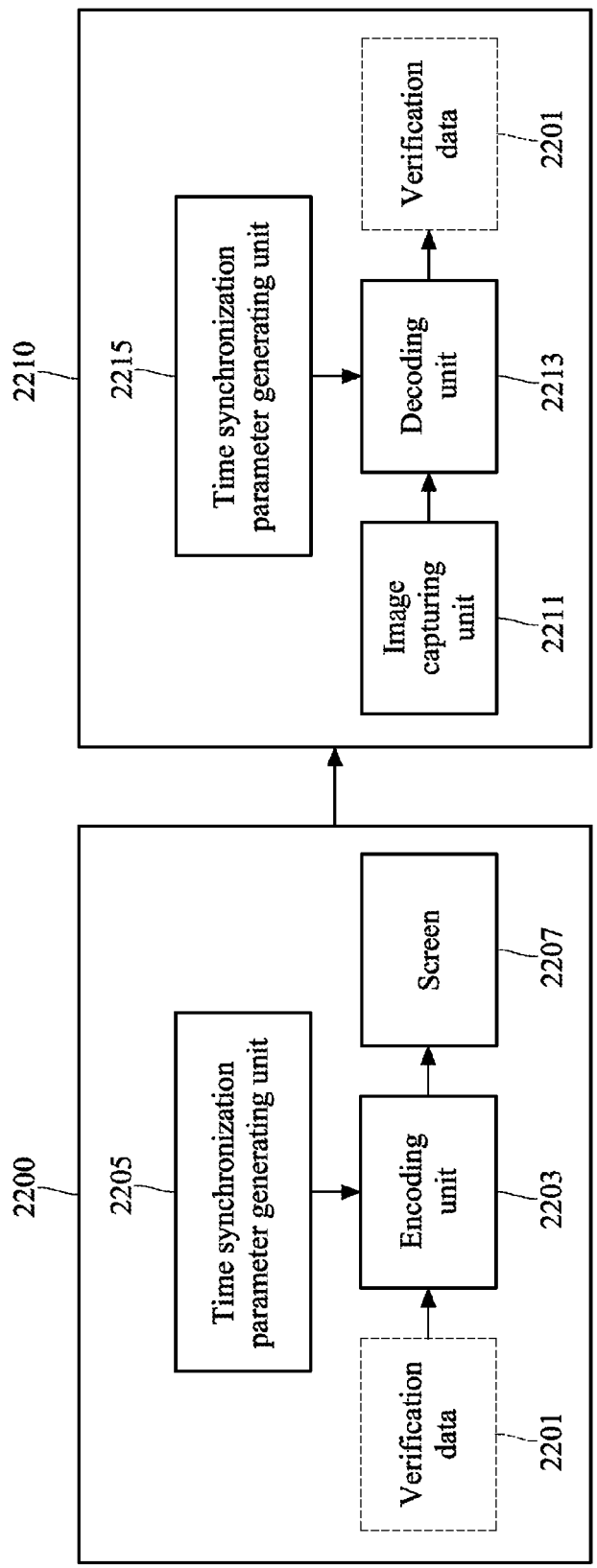
FIG. 22 is a schematic diagram of the data transmission between a user's mobile phone and a verification device in another embodiment.

In another embodiment, the data transmission between a user's mobile device, such as a mobile phone 2200, and a verification device 2210 can be worked out as shown in FIG. 22. Under a middle-security data transmission mode, the mobile phone 2200 uses a time synchronization parameter generating unit 2205 to generate a parameter according to verification data 2201 and uses an encoding unit 2203 to encode this parameter to generate an image stream and shows the image stream on a screen 2207. The verification device 2210 uses an image capturing unit 2211 to capture such an image stream and then uses a decoding unit 2213 to decode this image stream to obtain verification data 2201 according to the parameter generated by the time synchronization parameter generating unit 2215.

Figure 23:
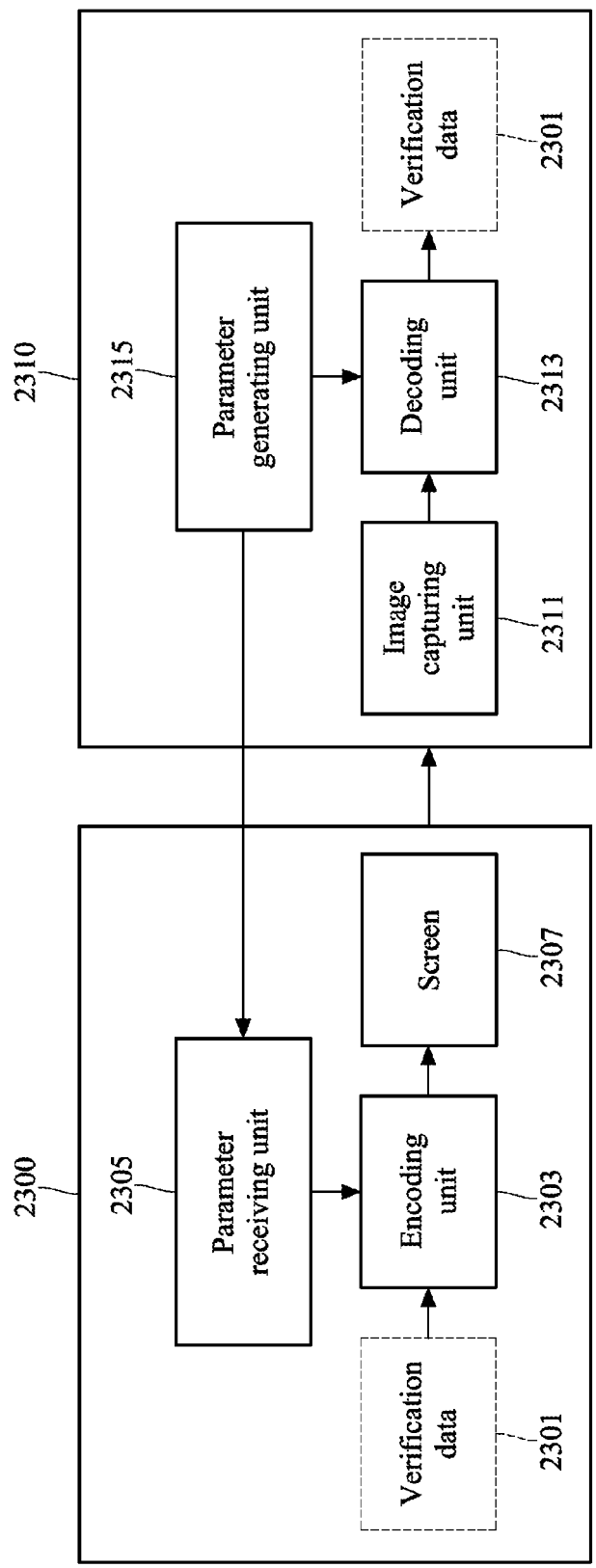
FIG. 23 is a schematic diagram of the data transmission between a user's mobile phone and a verification device in another embodiment.

In yet another embodiment, the data transmission between a user's mobile device, such as a mobile phone 2300, and a verification device 2310 can be worked out as shown in FIG. 23. Under a high-security data transmission mode, the mobile phone 2300 uses a parameter receiving unit 2305 to receive a parameter from a parameter generating unit 2315 in the verification device 2310, uses an encoding unit 2303 to encode verification data 2301 to generate an image stream according to this received parameter, and shows this image stream on a screen 2307. Then, the verification device 2310 uses an image capturing unit 2311 to capture such an image stream and uses a decoding unit 2313 to decode this captured image stream to obtain verification data 2301 according to the parameter generated by the parameter generating unit 2315.

Figure 24:
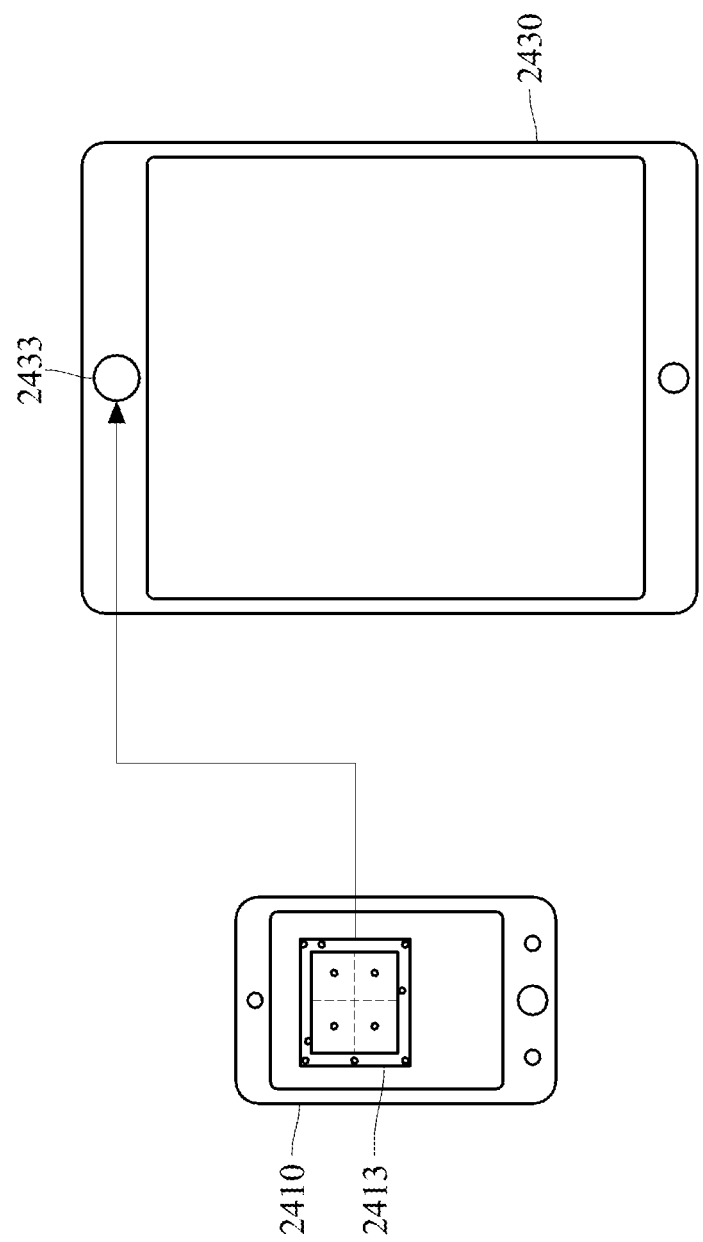
FIG. 24 is a schematic diagram of a transmission end and a receiving end in an embodiment.

In addition, the method and device of generating image streams having respective verification data are worked out by a transmission end and a receiving end under a visible light communications (VLC) technology in an embodiment. Please refer to FIG. 24. FIG. 24 is a schematic diagram of a transmission end 2410 and a receiving end 2430 in an embodiment. The transmission end 2410 includes a screen 2413 and can modify the pixel transmission data for the screen 2413 by the visible light communications technology. The transmission end 2410 is, for example, not limited to a mobile device, such as a smart mobile phone or a tablet computer, capable of displaying data. The receiving end 2430 includes an image capturing unit 2433 that is used to capture data provided by the transmission end 2410. The receiving end 2430 is, for example, not limited to a video camera or any possible device capable of capturing images.

Accordingly, the method and device of generating image streams having respective verification data can hide verification data within an image stream according to the first encoding parameter and the second encoding parameter. Also, the method and device of decoding image streams having respective verification data can extract verification data from an image stream according to the third encoding parameter and the fourth encoding parameter. Therefore, the disclosure may achieve an efficient verification of electronic tickets, save the human resource cost on manual ticket verification, and avoid mistakes in manual ticket verification.

What is claimed is:

1. A method of generating an image stream having verification data, comprising:
   determining at least one pixel in a first image according to a first encoding parameter;
   generating a timing data sequence associated with information about correlation between the verification data and time points according to a second encoding parameter and the verification data;
   modifying a pixel value of the at least one pixel in the first image to generate a second image according to the verification data corresponding to one of the time points in the timing data sequence; and
   generating the image stream comprising the second image;
   wherein loading an original image stream, the original image stream comprising a plurality of the first images;
   wherein modifying the pixel value of the at least one pixel in the first image to generate the second image further comprises:
   chronologically modifying a pixel value of the at least one pixel in each of the first images to generate the second image according to the verification data corresponding to each of the time points,
   wherein the second images are successive.

2. The method according to claim 1, wherein modifying the pixel value of the at least one pixel in the first image to generate the second image comprises:
   chronologically modifying the pixel value of the at least one pixel in the first image to generate the second image according to the verification data corresponding to each of the time points,
   wherein the second images are successive.

3. The method according to claim 2, wherein the image stream further comprises the second images which are successive.

4. The method according to claim 1, wherein the image stream further comprises the second images which are successive.

5. The method according to claim 1, wherein the first encoding parameter is a pixel parameter, and the second encoding parameter is a time parameter.

6. The method according to claim 1, wherein the first encoding parameter and the second encoding parameter are generated by performing function transition on a preset value according to time information, or are received by a transmission method after randomly generated.

7. A device of generating an image stream having verification data, comprising:
a memory unit configured to store a first encoding parameter, a second encoding parameter, and the verification data; and
an encoding unit electrically connected to the memory unit and configured to determine at least one pixel in a first image according to the first encoding parameter, generate a timing data sequence associated with information about correlation between time points and the verification data according to the second encoding parameter and the verification data, modify a pixel value of the at least one pixel in the first image to generate a second image according to the verification data corresponding to one of the time points in the timing data sequence, and generate a image stream comprising the second image;
wherein loading an original image stream, the original image stream comprising a plurality of the first images;
wherein modifying the pixel value of the at least one pixel in the first image to generate the second image further comprises:
chronologically modifying a pixel value of the at least one pixel in each of the first images to generate the second image according to the verification data corresponding to each of the time points,
wherein the second images are successive.

8. The device according to claim 7, wherein the image stream further comprises the second images which are successive.

9. The device according to claim 7, wherein the image stream further comprises the second images which are successive.

10. The device according to claim 7, wherein the first encoding parameter is a pixel parameter, and the second encoding parameter is a time parameter.

11. The device according to claim 7, wherein the first encoding parameter and the second encoding parameter are generated by performing function transition on a preset value according to time information, or are received by a transmission method after randomly generated.

12. A method of decoding an image stream having verification data, comprising:
obtaining an image stream;
detecting at least one pixel according to variations of third images in the image stream;
obtaining a timing data sequence according to a third encoding parameter and a variation of a pixel value of the at least one pixel; and
acquiring the verification data according to a fourth encoding parameter and the timing data sequence;
wherein loading an original image stream, the original image stream comprising a plurality of the first images;
wherein modifying the pixel value of the at least one pixel in the first image to generate the second image further comprises:
chronologically modifying a pixel value of the at least one pixel in each of the first images to generate the second image according to the verification data corresponding to each of the time points,
wherein the second images are successive.

13. The method according to claim 12, wherein the third encoding parameter is a pixel parameter, and the fourth encoding parameter is a time parameter.

14. The method according to claim 12, wherein the third encoding parameter and the fourth encoding parameter are generated by performing function transition on a preset value according to time information, or are received by a transmission method after randomly generated.

15. A device of decoding an image stream having verification data, comprising:
a memory unit configured to store a third encoding parameter, a fourth encoding parameter, an image stream, and the verification data;
an image capturing unit electrically connected to the memory unit and configured to capture the image stream; and
a decoding unit electrically connected to the memory unit and configured to detect at least one pixel according to variations of third images in the image stream, acquire a timing data sequence according to the third encoding parameter and a variation of a pixel value of the at least one pixel, and acquire the verification data according to the fourth encoding parameter and the timing data sequence;
wherein loading an original image stream, the original image stream comprising a plurality of the first images;
wherein modifying the pixel value of the at least one pixel in the first image to generate the second image further comprises:
chronologically modifying a pixel value of the at least one pixel in each of the first images to generate the second image according to the verification data corresponding to each of the time points,
wherein the second images are successive.

16. The device according to claim 15, wherein the third encoding parameter is a pixel parameter, and the fourth encoding parameter is a time parameter.

17. The device according to claim 15, wherein the third encoding parameter and the fourth encoding parameter are generated by performing function transition on a preset value according to time information, or are received by a transmission method after randomly generated.

* * * * *